W. E. COPITHORN.
DEMOUNTABLE RIM FOR AUTOMOBILE WHEELS.
APPLICATION FILED FEB. 10, 1913.
1,160,977.
Patented Nov. 16, 1915.
3 SHEETS—SHEET 1.
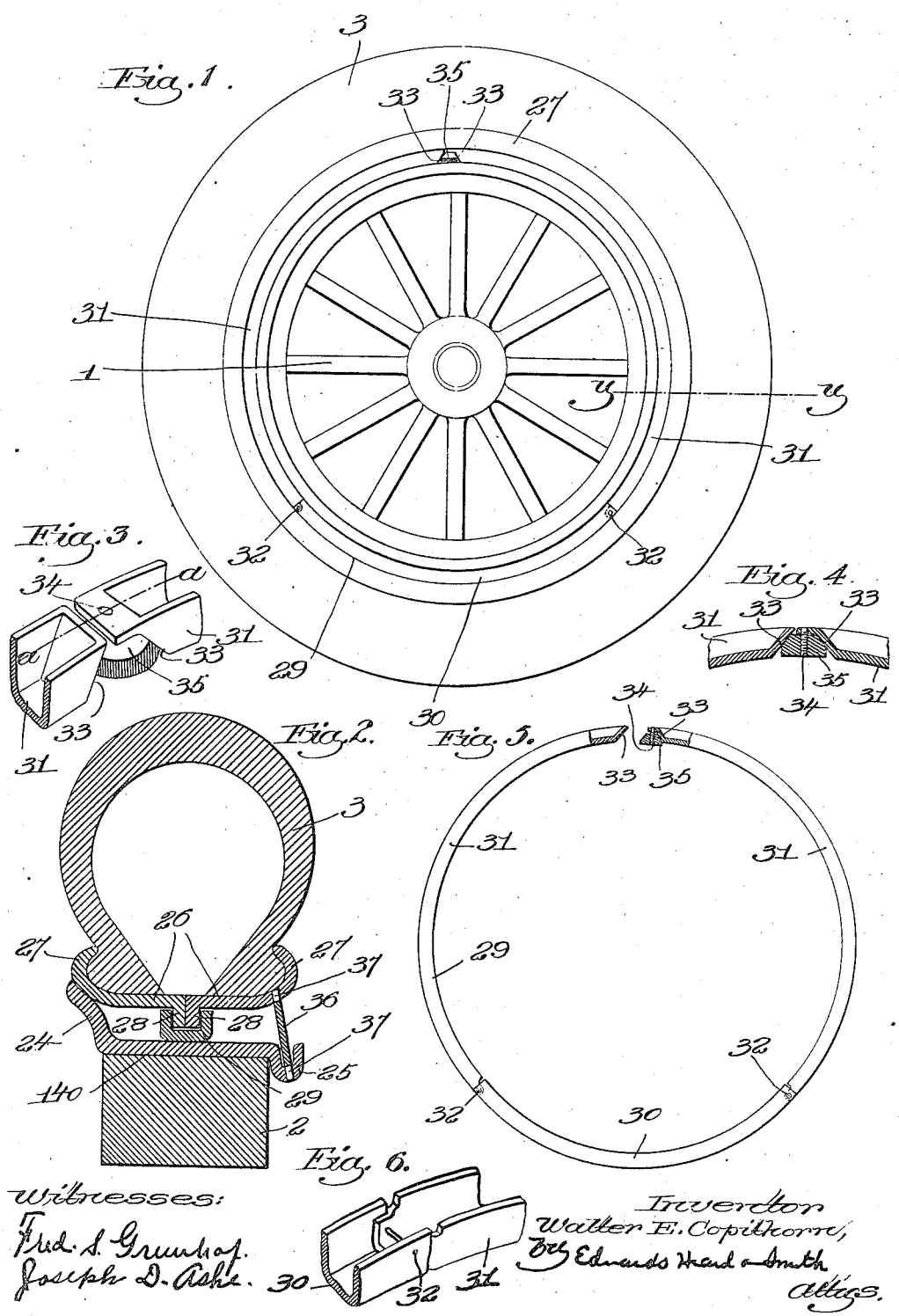

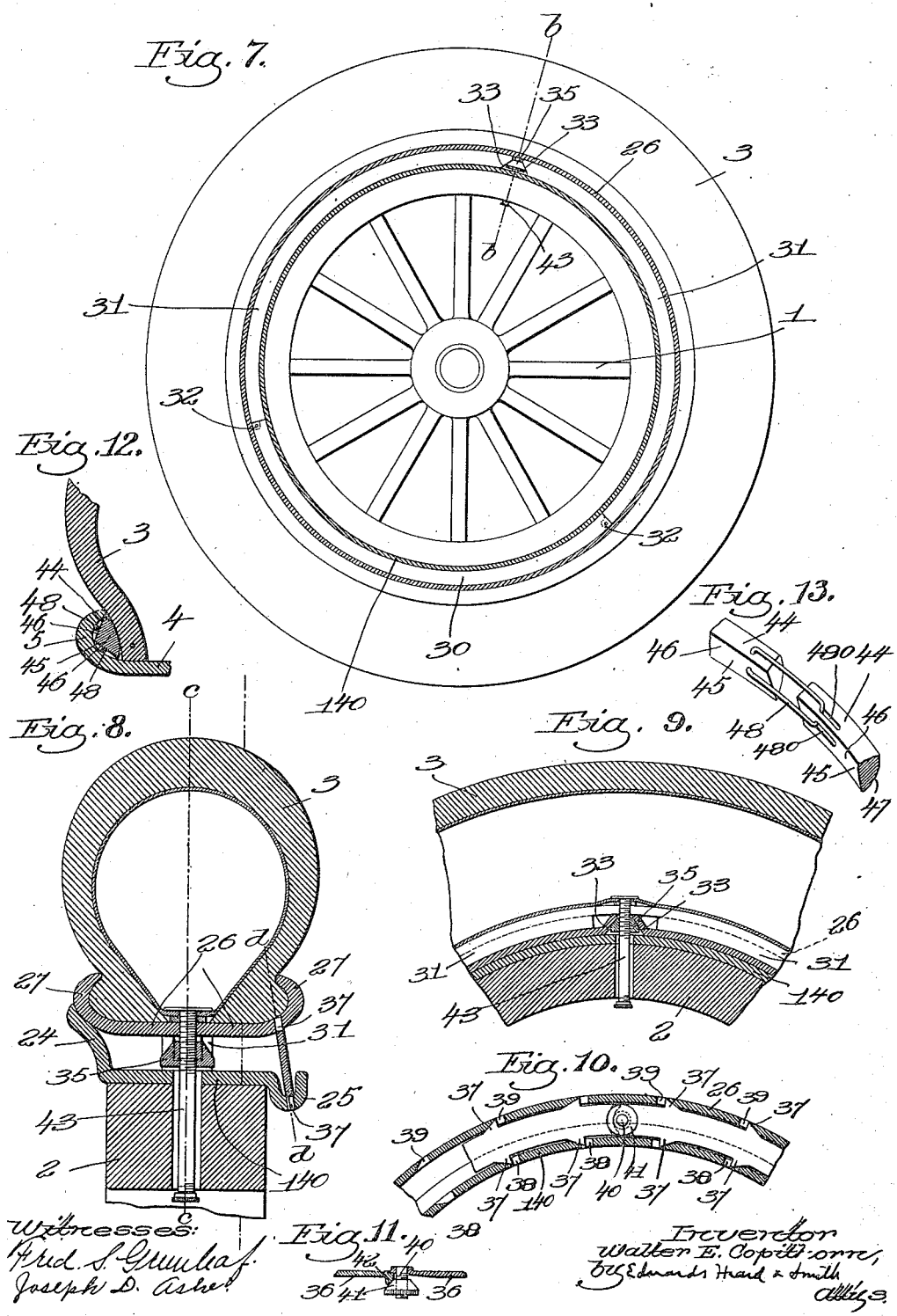

W. E. COPITHORN.
DEMOUNTABLE RIM FOR AUTOMOBILE WHEELS.
APPLICATION FILED FEB. 10, 1913.
1,160,977.
Patented Nov. 16, 1915.
3 SHEETS—SHEET 3.
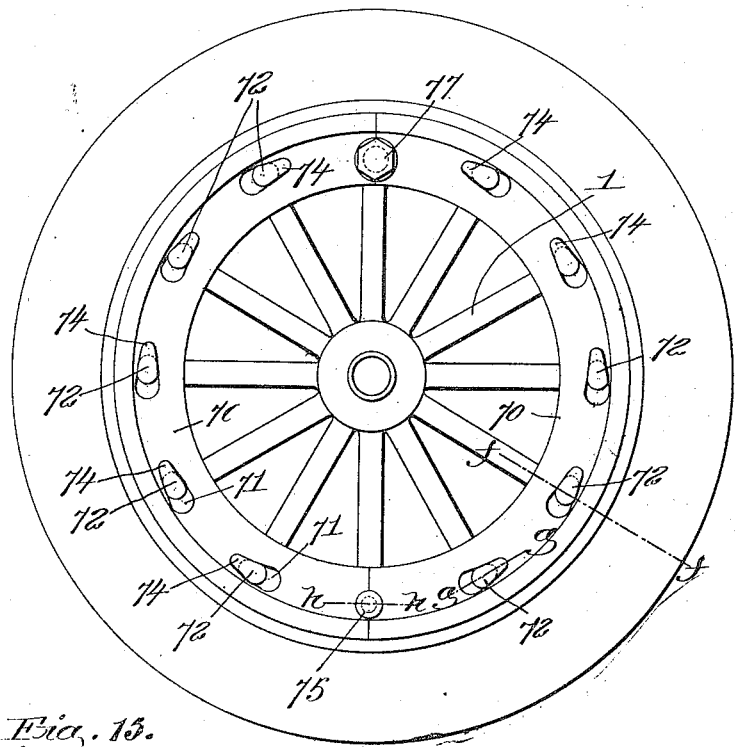
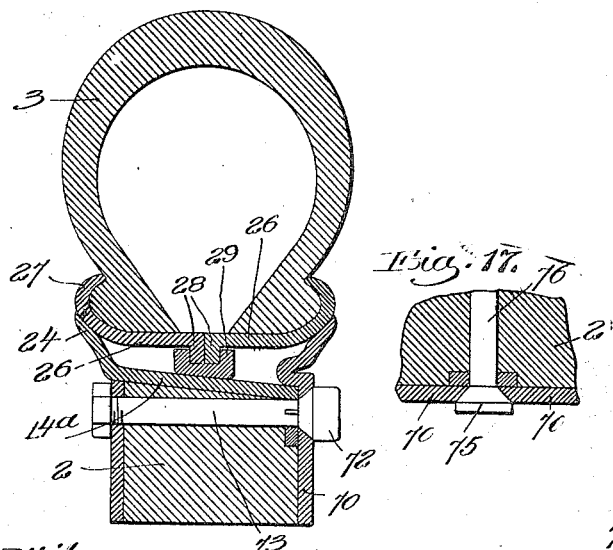
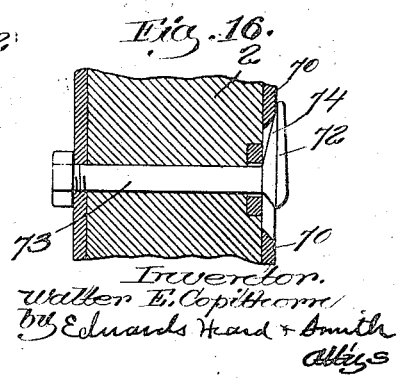

UNITED STATES PATENT OFFICE.

WALTER E. COPITHORN, OF NATICK, MASSACHUSETTS.

DEMOUNTABLE RIM FOR AUTOMOBILE-WHEELS.

1,160,977.                Specification of Letters Patent.        Patented Nov. 16, 1915.

Application filed February 10, 1913. Serial No. 747,273.

*To all whom it may concern:*

Be it known that I, WALTER E. COPITHORN, a citizen of the United States, residing at Natick, county of Middlesex, State of Massachusetts, have invented an Improvement in Demountable Rims for Automobile-Wheels, of which the following description, in connection with the accompanying drawing, is a specification, like characters on the drawing representing like parts.

This invention relates to quick-detachable tires and demountable rims for automobiles.

Some embodiments of the invention will first be described and then the novel features thereof will be pointed out in the appended claim.

Figure 1 is a side view of a wheel showing a different embodiment of the invention; Fig. 2 is an enlarged section on the line $y$—$y$, Fig. 1; Fig. 3 is a fragmentary perspective view of the locking ring; Fig. 4 is a section taken on substantially the line $a$—$a$, Fig. 3; Fig. 5 shows the locking ring removed; Fig. 6 is a detail of the locking ring; Fig. 7 is a side view of a wheel partly in section showing a different embodiment of my invention; Fig. 8 is an enlarged section on the line $b$—$b$, Fig. 7; Fig. 9 is a section on the line $c$—$c$, Fig. 8; Fig. 10 is a section on the line $d$—$d$, Fig. 8; Fig. 11 is a fragmentary view of the spacing ring; Fig. 12 shows a device for permitting a straight-faced tire to be used in a clencher rim; Fig. 13 is a detail of the filling ring shown in Fig. 11; Fig. 14 is a side view of a wheel showing a still different embodiment of my invention; Fig. 15 is an enlarged section on the line $f$—$f$, Fig. 14; Fig. 16 is an enlarged section on the line $g$—$g$, Fig. 14; Fig. 17 is a section on the line $h$—$h$, Fig. 14.

1 designates a wheel having the usual felly 2, and 3 designates the tire which is illustrated as a pneumatic tire. This tire is sustained by a demountable rim which is herein shown as divided circumferentially into two parts that are held together in a novel manner. The felly 2 has a felly band 140 encircling it which is provided at one edge with the positioning flange 24 to receive one side of the demountable rim and at the other side said felly band is provided with the grooved extension 25.

The demountable rim is made into two sections 26, each of which is formed with a clencher flange 27. The two sections 26 are provided at their meeting edges with the inwardly-directed flanges or lips 28, and said sections are held together by a locking ring 29 which has a general U-shape in cross-section. This locking ring is herein shown as made in three sections, there being a central section 30 and two end sections 31. These sections are pivotally connected together, as shown at 32, and means are provided for expanding the ring after it is in place thereby to firmly hold the parts in position. The end of each of the end sections 31 is provided with a bevel face 33 and one of the sections has a screw-threaded stud 34 extending therefrom on which is mounted a cone nut 35 that is adapted to engage the beveled surfaces 33.

In assembling the parts the two demountable rim sections 26 are placed together with the tire 3 between them and the locking ring 29 is then placed over the flanges 28. The fact that the sections of the locking ring are hinged together permits the sections 31 to be swung inwardly to thereby reduce the diameter of the locking ring sufficiently to permit it to be swung over the flanges 28. When the locking ring is in position the nut 35 is screwed up tight thereby expanding the locking ring until it fits the interior of the demountable rim. The locking ring is thus firmly held in position and it holds the two sections of the demountable rim in place. The demountable rim thus assembled can then be placed on the felly band 140, and it is held there by a suitable positioning member. In the construction shown in Fig. 8 this positioning member is a two-part ring, each part having a plurality of inclined teeth 37 extending from each edge thereof. These teeth 37 fit into notches 38 and 39 formed in the felly band 140, and the demountable rim, respectively, the notches in the felly band preferably being situated in the extension 25. One of the parts of the positioning member 36 has a screw-threaded stud 40 extending therefrom at one end, and on this stud is screw-threaded a cone-shaped nut 41 which is adapted to engage an inclined face 42 formed on the other part of the positioning ring. The two parts of the positioning ring are set into place and by tightening up the nut 41 they are crowded apart, as shown in Fig. 10, thus bringing the inclined teeth 37 thereon into operative engagement with the felly band and demountable rim. It should be remarked that the teeth 37 on the two parts of the locking member are faced in opposite directions. This member 36 when in position serves to space the demountable rim from the felly band and to also hold it against lateral movement.

In Figs. 7, 8 and 9 I have shown an embodiment of the invention where the cone nut 35 for expanding the locking ring 29 is screwed onto the valve stem 43 instead of onto a stud carried by one of the members of the ring. In other respects the invention shown in these figures is similar to that shown in Figs. 1, 2 and 3.

In Figs. 12 and 13 I have shown a filling ring which is adapted to be used to convert the clencher rim into one adapted to receive a straight-faced tire. This filling ring is designated by 44 and it is made with the two outer flat faces 45 and 46, and the inner curved face 47, it thus having a sort of triangular shape in cross section. It is a split ring and the two ends thereof are connected by a link 48 which extends through a slot 480 in one member. This construction allows the ring to expand or contract as necessary to fit the rim, and when the filling ring is in place the flat sides 44, 45, face outward and the rounded face 47 faces inwardly and engages the tire 3. The flat faces 44 and 45 not only provide room for the link 48, but they also provide a construction whereby the ring will readily find a true bearing against the clencher ring.

In Figs. 14 and 17 I have shown a different embodiment of the invention. In this construction the demountable rim has the two-part construction shown in Figs. 1, 2 and 3, but the demountable rim is locked in place by a locking ring comprising the two sections 70, each having the slots 71 therein that are adapted to fit over the heads 72 of bolts or studs 73 carried by the rim. The heads 72 of the bolts have tapering beaks or noses 74 behind which the locking ring sections 70 enter, as shown in Fig. 16. The two adjacent ends of the locking ring sections 70 are engaged behind the head 75 of a stud 76, and the two locking ring sections 70 are held in place by a cone nut 77 which screws onto a stud carried by the felly and engages the other ends of the locking ring sections. These locking ring sections are placed over the heads 72 of the studs, and when the cone 77 is tightened they are forced apart at the end where the cone is situated, thus causing the narrow ends of the slots 71 to enter behind the heads 72. The tapering faces 74 of the heads causes the locking rings to hug the felly tightly.

In Fig. 15 the exterior face of the felly 2 is made on an incline and the felly band 14ª is also tapered. The advantage of this construction is that when the demountable rim is in place it will have bearing on the upturned portion 24 of the felly band and the locking ring 29 also has bearing against the inclined face of the felly band 14ª.

Having fully described my invention, what I claim as new and desire to secure by Letters Patent is:—

In a device of the class described, the combination with a rim divided into two parts, each part having an inturned flange, of a sectional locking ring U-shape in cross section and adapted to embrace said two flanges, the sections of the locking ring being pivoted together, and a cone member coöperating with said locking ring to expand it into firm engagement with the rim.

In testimony whereof, I have signed my name to this specification, in the presence of two subscribing witnesses.

WALTER E. COPITHORN.

Witnesses:
BERTHA F. HEUSER,
LOUIS C. SMITH.